(12) United States Patent
Tamrakar et al.

(10) Patent No.: US 12,745,243 B2
(45) Date of Patent: Sep. 22, 2026

(54) WAVEFORM SWITCHING-BASED UPLINK DATA TRANSMISSION METHOD, TERMINAL, AND MEDIUM

(71) Applicant: VIVO MOBILE COMMUNICATION CO., LTD., Dongguan (CN)

(72) Inventors: Rakesh Tamrakar, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 311 days.

(21) Appl. No.: 18/526,094

(22) Filed: Dec. 1, 2023

(65) Prior Publication Data

US 2024/0107530 A1 Mar. 28, 2024

Related U.S. Application Data

(63) Continuation of application No. PCT/CN2022/096836, filed on Jun. 2, 2022.

(30) Foreign Application Priority Data

Jun. 2, 2021 (CN) ......................... 202110615438.0

(51) Int. Cl.

*H04W 72/1268* (2023.01)
*H04L 5/00* (2006.01)
*H04W 72/232* (2023.01)

(52) U.S. Cl.

CPC ....... *H04W 72/1268* (2013.01); *H04L 5/0051* (2013.01); *H04W 72/232* (2023.01); *H04L 5/0007* (2013.01)

(58) Field of Classification Search

CPC ............ H04W 72/1268; H04W 72/232; H04L 5/0051; H04L 5/0007; H04L 1/0003;
(Continued)

(56) References Cited

U.S. PATENT DOCUMENTS 11,411,697 B2 8/2022 Nakamura et al.
2019/0260623 A1 8/2019 Li et al.
(Continued)

FOREIGN PATENT DOCUMENTS

CN 111316729 A 6/2020
EP 3522471 A1 8/2019
(Continued)

OTHER PUBLICATIONS

Qualcomm Incorporated, "Potential coverage enhancement techniques for PUSCH", 3GPP TSG-RAN WG1 Meeting #103e, e-Meeting, Oct. 26-Nov. 13, 2020, R1-2008626.
(Continued)

*Primary Examiner* — Charles C Jiang
(74) *Attorney, Agent, or Firm* — The Webb Law Firm

(57) ABSTRACT

An uplink data transmission method includes in a case that UE is configured to transmit uplink data using a first waveform, receiving, by the UE, DCI from a network-side device, where the target DCI is used for scheduling target uplink data; and in a case that indication information contained in the target DCI satisfies a first preset condition, transmitting, by the UE, the target uplink data using a second waveform; where the indication information is used to indicate a transmission parameter for the target uplink data.

20 Claims, 5 Drawing Sheets

In a case that an uplink data transmission apparatus is configured to transmit uplink data using a first waveform, the uplink data transmission apparatus receives target DCI from a network-side device — 101

In a case that indication information contained in the target DCI satisfies a first preset condition, the uplink data transmission apparatus determines a target transmission port based on a first DMRS indication information field — 301

The uplink data transmission apparatus transmits a DMRS using a second waveform based on the target transmission port — 102b

(58) Field of Classification Search
CPC ... H04L 1/0009; H04L 1/0026; H04L 5/0023; H04L 5/0028; H04L 5/0044; H04L 5/0048; H04L 5/0053; H04L 5/0091; H04L 27/0008; H04L 27/0012; H04L 27/26136; H04L 27/2636; Y02D 30/70
See application file for complete search history.

(56) References Cited

U.S. PATENT DOCUMENTS

| | | | |
|---|---|---|---|
| 2020/0404668 A1* | 12/2020 | Nakamura | H04L 1/0026 |
| 2021/0044467 A1 | 2/2021 | Xi et al. | |
| 2021/0075570 A1 | 3/2021 | Xi et al. | |
| 2022/0376965 A1* | 11/2022 | Ramirez-Gutierrez | H04L 27/2602 |

FOREIGN PATENT DOCUMENTS

| | | |
|---|---|---|
| JP | 2020509677 A | 3/2020 |
| WO | 2021047973 A1 | 3/2021 |

OTHER PUBLICATIONS

China Telecom, “Further discussion on NR PUSCH demodulation requirements”, 3GPP TSG-RAN WG4 Meeting #88, Gothenburg, SE, Aug. 20-24, 2018, R4-1809661.

Samsung, “Codebook-based UL transmission”, 3GPP TSG RAN WG1 Meeting #91, Reno USA, Nov. 27-Dec. 1, 2017, R1-1721399.

Vivo, “NR UL power control framework”, 3GPP TSG RAN WG1 Meeting #90, Prague, P.R. Czech, Aug. 21-25, 2017, R1-1712874.

Futurewei, “Enhancements on SRS flexibility, coverage and capacity”, 3GPP TSG RAN WG1 Meeting #104bis-e, R1-2102765, Apr. 12-20, 2021, 33 pages.

* cited by examiner

WAVEFORM SWITCHING-BASED UPLINK DATA TRANSMISSION METHOD, TERMINAL, AND MEDIUM

CROSS-REFERENCE TO RELATED APPLICATIONS

This application is a Bypass Continuation Application of International Patent Application No. PCT/CN2022/096836 filed Jun. 2, 2022, and claims priority to Chinese Patent Application No. 202110615438.0 filed Jun. 2, 2021, the disclosures of which are hereby incorporated by reference in their entireties.

BACKGROUND OF THE INVENTION

Field of the Invention

This application pertains to the field of communication technologies, and specifically relates to an uplink data transmission method, a terminal, and a medium.

Description of Related Art

Currently, in a new radio (NR) system, user equipment (UE) may receive radio resource control (RRC) signaling from a network-side device and transmit uplink data using cyclic prefix orthogonal frequency division multiplexing (CP-OFDM) waveform or discrete fourier transform-spread orthogonal frequency division multiplexing (DFT-S-OFDM) waveform based on waveform configuration information contained in the RRC signaling.

SUMMARY OF THE INVENTION

According to a first aspect, an uplink data transmission method is provided. The method includes: in a case that UE is configured to transmit uplink data using a first waveform, receiving, by the UE, target downlink control information DCI from a network-side device, where the target DCI is used for scheduling the target uplink data; and in a case that indication information contained in the target DCI satisfies a first preset condition, transmitting, by the UE, the target uplink data using a second waveform; where the indication information is used to indicate a transmission parameter for the target uplink data.

According to a second aspect, an uplink data transmission apparatus is provided. The uplink data transmission apparatus includes a receiving module and a transmission module. The receiving module is configured to receive target DCI from a network-side device in a case that the uplink data transmission apparatus is configured to transmit uplink data using a first waveform, where the target DCI is used for scheduling target uplink data. The transmission module is configured to transmit the target uplink data using the second waveform in a case that the indication information contained in the target DCI received by the receiving module satisfies a first preset condition; where the indication information is used to indicate a transmission parameter for the target uplink data.

According to a third aspect, a terminal is provided. The terminal includes a processor, a memory, and a program or instructions stored on the memory and executable on the processor, and when the program or instructions are executed by the processor, the steps of the method in the first aspect are implemented.

According to a fourth aspect, a terminal is provided, including a processor and a communication interface. The communication interface is used to receive target downlink control information DCI from a network-side device in a case that the terminal is configured to transmit uplink data using a first waveform, where the target DCI is used for scheduling target uplink data; and to transmit the target uplink data using a second waveform in a case that indication information contained in the target DCI satisfies a first preset condition; where the indication information is used to indicate a transmission parameter for the target uplink data.

According to a fifth aspect, a non-transitory readable storage medium is provided. The non-transitory readable storage medium stores a program or instructions, and when the program or instructions are executed by a processor, the steps of the method in the first aspect or the steps of the method in the third aspect are implemented.

According to a sixth aspect, a chip is provided. The chip includes a processor and a communications interface. The communications interface is coupled to the processor, and the processor is configured to run a program or instructions to implement the method according to the first aspect.

According to a seventh aspect, a computer program/program product is provided. The computer program/program product is stored in a non-volatile storage medium, and the program/program product is executed by at least one processor to realize the steps of the method in the first aspect.

DESCRIPTION OF THE INVENTION

Figure 1:
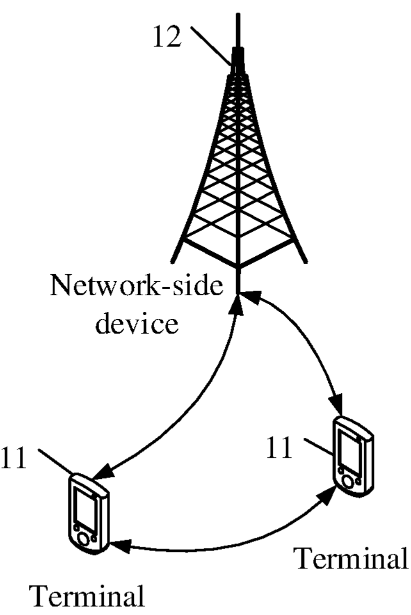
FIG. 1 is a block diagram of a wireless communications system according to an embodiment of this application.

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The following describes in detail the terms used in the embodiments of this application.

1. Configuration of Uplink Data Transmission Waveform

The waveform for the UE to transmit uplink data can be semi-statically configured by RRC signaling received from a network-side device.

In a case that transformPrecoder in the RRC signaling is configured as enabled, the UE transmits uplink data using DFT-S-OFDM and the uplink transmission is limited to single-stream transmission.

In a case that transformPrecoder in the RRC signaling is configured as disabled, the UE transmits uplink data using CP-OFDM, and the uplink transmission can be single-stream transmission or multi-stream transmission.

2. Transmit Precoding Matrix Indicator Field

In the embodiments of this application, the transmit precoding matrix indicator field is referred to as the TPMI field.

This TPMI field can indicate both precoding information and data stream count information in one information field. The precoding information is used to indicate a precoding matrix.

3. Other Terms

The terms "first", "second", and the like in this specification and claims of this application are used to distinguish between similar objects rather than to describe a specific order or sequence. It should be understood that terms used in this way are interchangeable in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "/" generally indicates that the associated objects have an "or" relationship.

It should be noted that technologies described in the embodiments of this application are not limited to a long term evolution (LTE) or LTE-Advanced (LTE-A) system, and may also be applied to other wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technology described herein may be used in the above-mentioned systems and radio technologies as well as other systems and radio technologies. In the following descriptions, a new radio (NR) system is described for an illustration purpose, and NR terms are used in most of the following descriptions, although these technologies may also be applied to other applications than the NR system application, for example, the 6th generation (6G) communication system.

FIG. 1 is a block diagram of a wireless communications system to which the embodiments of this application are applicable. The wireless communication system includes a terminal 11 and a network-side device 12. The terminal 11 may also be referred to as a terminal device or user equipment (UE), and the terminal 11 may be a terminal-side device, such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a smartwatch, a wrist band, earphones, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception Point (TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

Typically, UE can transmit a single stream of uplink data using the CP-OFDM waveform, referred to as single-stream transmission; alternatively, the UE can transmit multiple streams of uplink data using the DFT-S-OFDM waveform, referred to as multi-stream transmission.

However, when the UE uses the CP-OFDM waveform for single-stream transmission, a high peak to average power ratio (PAPR) of reference signal symbols may occur, leading to lower power amplifier efficiency.

The following describes in detail an uplink data transmission method provided in the embodiments of this application through specific embodiments and application scenarios thereof with reference to the accompanying drawings.

Figure 2:
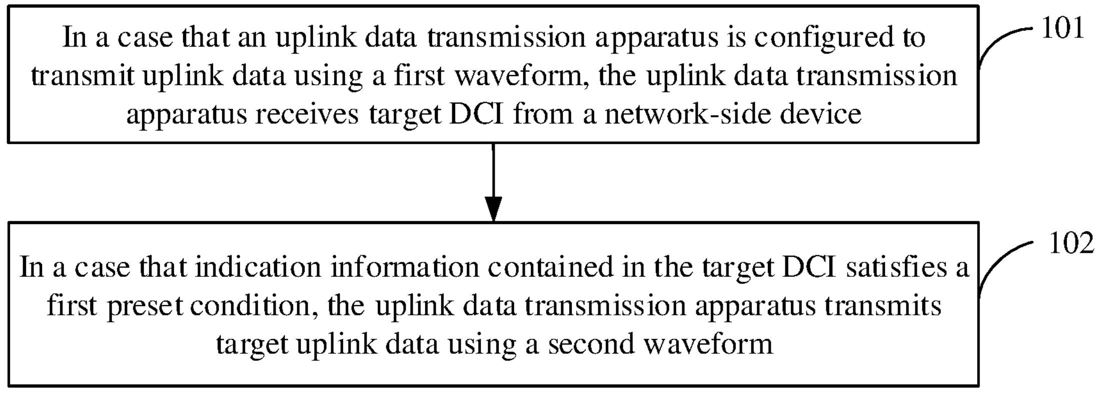
FIG. 2 is a first schematic diagram of an uplink data transmission method according to an embodiment of this application.

FIG. 2 is a flowchart of an uplink data transmission method according to an embodiment of this application. As shown in FIG. 2, the uplink data transmission method provided in the embodiment of this application may include step 101 and step 102 as described below.

Step 101. In a case that an uplink data transmission apparatus is configured to transmit uplink data using a first waveform, the uplink data transmission apparatus receives target DCI from a network-side device.

Optionally, in the embodiment of this application, the first waveform may be any one of the following: CP-OFDM and DFT-S-OFDM.

Optionally, in the embodiment of this application, the uplink data transmission apparatus may receive RRC signaling from the network-side device and is configured, according to transformPrecoder in the RRC signaling, to transmit uplink data using the first waveform.

In the embodiment of this application, the target DCI is used for scheduling target uplink data.

Step 102. In a case that indication information contained in the target DCI satisfies a first preset condition, the uplink data transmission apparatus transmits target uplink data using a second waveform.

In the embodiment of this application, the indication information is used to indicate a transmission parameter for the target uplink data.

Optionally, in an embodiment of this application, the indication information may be one piece of indication information or may include a plurality pieces of sub-indication information.

Optionally, in an embodiment of this application, the indication information includes at least one of: TPMI field, detection reference signal resource indicator (SRI) field, frequency domain resource assignment (FDRA) field, modulation and coding mode (MCS) index value, or channel state information (CSI) request field.

Further optionally, in the embodiment of this application, the above indication information may further include at least one of the following: a physical/virtual resource block (PRBNRB) allocation indication information field, a time domain resource assignment (TDRA) indication information field, or a demodulation reference signal (DMRS) indication information field.

Optionally, in an embodiment of this application, in a case that the first waveform is CP-OFDM and the second waveform is DFT-S-OFDM, the above indication information satisfying the first preset condition includes at least one of the following:

- a rank corresponding to the TPMI field is less than or equal to a first threshold;
- a rank corresponding to the SRI field is less than or equal to a second threshold;
- physical resource blocks PRBs indicated by the FDRA field are contiguous;
- the MCS index value is less than a third threshold;
- the indication information does not contain a CSI request field; or
- the indication information contains a CSI request field, and the CSI request field is not used to trigger the uplink data transmission apparatus to send a CSI report.

In the embodiment of this application, in a case that the indication information satisfies the first preset condition, it can be considered that the uplink data transmission apparatus is scheduled for single-stream transmission, and in a case that the uplink data transmission apparatus uses CP-OFDM for single-stream transmission, a PAPR of reference signal symbols is high, and therefore the uplink data transmission apparatus can use a DFT-S-OFDM waveform for single-stream transmission (that is, target uplink data transmission) to reduce the PAPR of the reference signal symbols.

Optionally, in an embodiment of this application, in a case that the first waveform is DFT-S-OFDM and the second waveform is CP-OFDM, the above indication information satisfying the first preset condition includes at least one of the following:

- a rank corresponding to the TPMI field is greater than a first threshold;
- a rank corresponding to the SRI field is greater than a second threshold;
- PRBs indicated by the FDRA field are continuous or discontinuous;
- the MCS index value is greater than a third threshold; or
- the indication information includes the CSI request field.

In the embodiment of this application, in a case that the indication information satisfies the first preset condition, it can be considered that the uplink data transmission apparatus is scheduled for multistream transmission, and in a case that the uplink data transmission apparatus uses DFT-S-OFDM for multistream transmission, a PAPR of reference signal symbols is high, and therefore, the uplink data transmission apparatus can use a CP-OFDM waveform for multistream transmission (that is, target uplink data transmission) to reduce the PAPR of the reference signal symbols.

In the embodiment of this application, in a case that the uplink data transmission apparatus is configured to transmit the uplink data using CP-OFDM, the uplink data transmission apparatus is scheduled for single-stream transmission, and the first preset condition is satisfied, the uplink data transmission apparatus may transmit the target uplink data using DFT-S-OFDM.

In a case that the uplink data transmission apparatus is configured to transmit the uplink data using CP-OFDM, the uplink data transmission apparatus is scheduled for single-stream transmission, and the first preset condition is not satisfied, the uplink data transmission apparatus still transmits the target uplink data using CP-OFDM.

In a case that the uplink data transmission apparatus is configured to transmit the uplink data using DFT-S-OFDM, the uplink data transmission apparatus is scheduled for multi-stream transmission, and the first preset condition is satisfied, the uplink data transmission apparatus may transmit the target uplink data using CP-OFDM.

In the uplink data transmission method provided in the embodiments of this application, in a case that the uplink data transmission apparatus is configured to transmit the uplink data using the first waveform, the uplink data transmission apparatus may receive target DCI from a network-side device for scheduling the target uplink data, and in a case that the indication information contained in the target DCI satisfies the first preset condition, directly transmit the target uplink data using the second waveform, where the indication information is used for indicating a transmission parameter for the target uplink data. In a case that the uplink data transmission apparatus is configured to transmit the uplink data using the first waveform, the uplink data transmission apparatus may determine whether the indication information contained in the target DCI satisfies the first preset condition, and in a case that the indication information is determined to satisfy the first preset condition, the uplink data transmission apparatus transmits the target uplink data using the second waveform instead of transmitting the target uplink data using the preconfigured first waveform. Therefore, the PAPR of reference signal symbols can be reduced. In this way, the amplifier efficiency of the uplink data transmission apparatus can be improved.

In the embodiment of this application, in a case that the uplink data transmission apparatus transmits the target uplink data using the second waveform, some sub-indication information in the target DCI may be invalid for the second waveform, such that the uplink data transmission apparatus may transmit the target uplink data using the second waveform based on sub-indication information other than the some sub-indication information, that is, ignoring the some sub-indication information.

In the following example, the some sub-indication information is Q pieces of sub-indication information.

Figure 3:
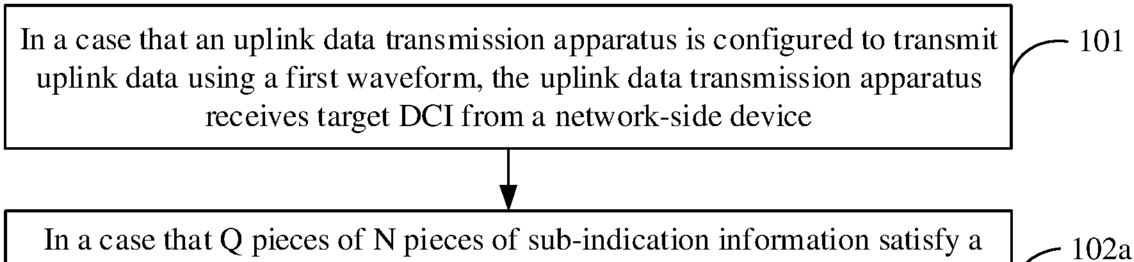
FIG. 3 is a second schematic diagram of an uplink data transmission method according to an embodiment of this application.

Optionally, in an embodiment of this application, the indication information contains N pieces of sub-indication information, and N is a positive integer. With reference to FIG. 2, as shown in FIG. 3, the step 102 can be realized by the following step 102*a*.

Step 102*a*. In a case that Q pieces of N pieces of sub-indication information satisfy a second preset condition, the uplink data transmission apparatus transmits target uplink data using a second waveform according to other sub-indication information.

In the embodiment of this application, the other sub-indication information is sub-indication information in the N pieces of sub-indication information other than the Q pieces of sub-indication information, and Q is a positive integer.

It can be understood that the uplink data transmission apparatus transmits the target uplink data using the second waveform according to the other sub-indication information, that is, the uplink data transmission apparatus ignores the Q pieces of sub-indication information that satisfy the second preset condition, of the N pieces of sub-indication information.

Further optionally, in the embodiment of this application, the above second preset condition may be that the sub-indication information is invalid for the second waveform.

For example, assuming that the N pieces of sub-indication information include a phasetracking reference signal (PTRS)-DMRS association information field, the PTRS-DMRS association is 2 bits, and the PTRS-DMRS association is invalid for the second waveform (for example, DFT-S-OFDM), the uplink data transmission apparatus may ignore the PTRS-DMRS association.

In the embodiment of this application, the uplink data transmission apparatus may transmit the target uplink data using the second waveform according to the transmission parameters indicated by other sub-indication information.

It can be seen that the uplink data transmission apparatus can transmit the target uplink data using the second waveform according to the other sub-indication information that is valid for the second waveform of the N pieces of sub-indication information contained in the target DCI, without transmitting the target uplink data according to the Q pieces of sub-indication information that are invalid for the second waveform. Therefore, the reliability of the uplink data transmission apparatus in transmitting the uplink data can be improved.

In the embodiment of this application, the uplink data transmission apparatus may also keep the size of specified sub-indication information of the plurality of pieces of sub-indication information unchanged, and interpret the specified sub-indication information in a new way.

In the following example, the specified sub-indication information is a DMRS indication information field.

Figure 4:
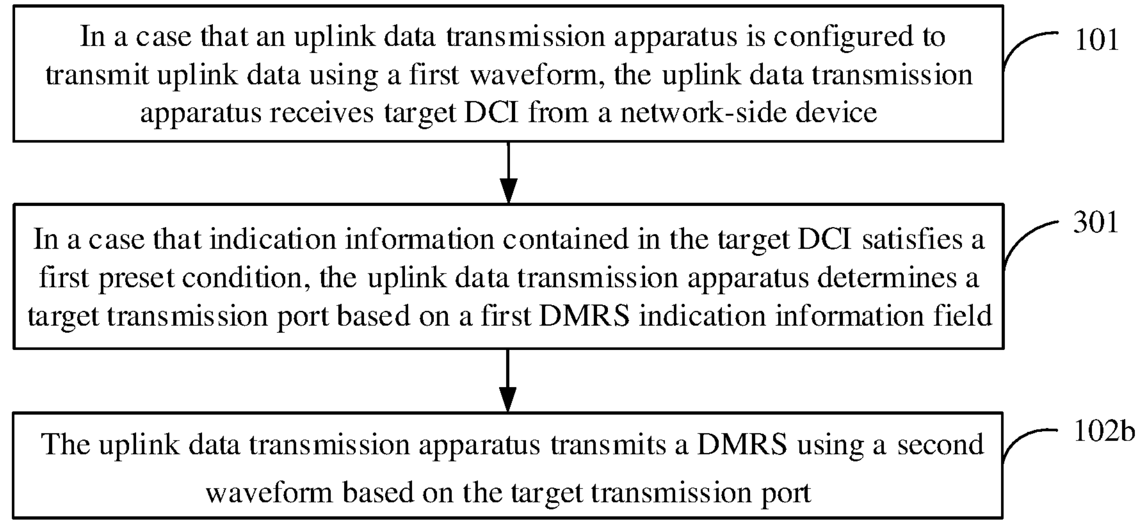
FIG. 4 is a third schematic diagram of an uplink data transmission method according to an embodiment of this application.

Optionally, in an embodiment of this application, the indication information includes a first demodulation reference signal DMRS indication information field, where the first DMRS indication information field is used to indicate: a transmission port of a DMRS for use by the target uplink data, in a case of being configured to transmit the target uplink data using the first waveform. With reference to FIG. 2, as shown in FIG. 4, before “the uplink data transmission apparatus transmits target uplink data using a second waveform” in the step 102, the uplink data transmission method according to an embodiment of this application may further include the following step 301, and the step 102 may be realized by the step 102*b*.

Step 301. In a case that indication information contained in the target DCI satisfies a first preset condition, the uplink data transmission apparatus determines a target transmission port based on a first DMRS indication information field.

Further optionally, in the embodiment of this application, the uplink data transmission apparatus may, based on a preconfigured first DMRS indication table for the first waveform and a preconfigured second DMRS indication table for the second waveform, determine the target transmission port based on a first DMRS indication information field and the first DMRS indication table (or second DMRS indication table). The first DMRS indication table includes at least one state, the second DMRS indication table includes at least one state, the number of states in the first DMRS indication table is different from the number of states in the second DMRS indication table.

For example, Table 1 is a DMRS indication table corresponding to DFT-S-OFDM.

TABLE 1

| Value (Index value) | Number of DMRS CDM group(s) without data | DMRS port(s) |
|---|---|---|
| 0 | 2 | 0 |
| 1 | 2 | 1 |
| 2 | 2 | 2 |
| 3 | 2 | 3 |

As shown in Table 1, this DMRS indication table includes 4 states (that is, the number of states is 4) indicated with a total of 2 bits.

Table 2 is a DMRS indication table corresponding to CP-OFDM.

TABLE 2

| Value (Index value) | Number of DMRS CDM group(s) without data | DMRS port(s) |
|---|---|---|
| 0 | 1 | 0 |
| 1 | 1 | 1 |
| 2 | 2 | 0 |
| 3 | 2 | 1 |
| 4 | 2 | 2 |
| 5 | 2 | 3 |
| 6-7 | Reserved | Reserved |

As shown in Table 2, this DMRS indication table includes 6 states (that is, the number of states is 6) indicated with a total of 3 bits.

Optionally, in a possible implementation of an embodiment of this application, the first DMRS indication information field corresponds to X bits, X is determined based on a waveform with a larger number of states between the first waveform and the second waveform, and X is a positive integer.

Further optionally, in an embodiment of this application, X is the number of bits of a waveform with a larger number of states between the first waveform and the second waveform.

For example, the number of states of the first waveform is 6, the first waveform occupies 3 bits, the number of states of the second waveform is 4, and the second waveform occupies 2 bits. In this case, X is the number of bits of a waveform with a larger number of states (that is, the first waveform) between the first waveform and the second waveform, that is, 3 bits.

In the embodiment of this application, in a case that the number of states corresponding to the second waveform is less than the number of states corresponding to the first waveform, the target transmission port is a transmission port indicated by the target bit. The target bit is the first Y bits or the last Z bits of X bits, and Y and Z are positive integers.

Further optionally, in the embodiment of this application, Y and Z may be the same or different, that is, Y=Z, or Y≠Z.

For example, the second waveform is DFT-S-OFDM, the first waveform is CP-OFDM, and with reference to Tables 1 and 2, the number of states corresponding to DFT-S-OFDM is less than the number of states corresponding to CP-OFDM. In this case, the target transmission port is a DMRS port indicated by the first Y (for example, 2) bits or a DMRS port indicated by the last Z (for example, 2) bits.

In the embodiment of this application, in a case that the number of states corresponding to the second waveform is greater than the number of states corresponding to the first waveform, the length of the DMRS information field and the target transmission port are a transmission port determined based on a state corresponding to the second waveform.

For example, the second waveform is CP-OFDM and the first waveform is DFT-S-OFDM, and with reference to Tables 1 and 2, the number of states corresponding to CP-OFDM is greater than the number of states corresponding to DFT-S-OFDM. In this case, the length of the DMRS information field and the target transmission port are the transmission port determined according to the states corresponding to CP-OFDM (that is, six states in Table 2).

It can be seen that the uplink data transmission apparatus can interpret the first DMRS indication information in a new way based on the number of states corresponding to the second waveform and the number of states corresponding to the first waveform, so as to determine the target transmission port. Therefore, the reliability of the uplink data transmission apparatus in transmitting the uplink data can be improved.

Optionally, in another possible implementation of the embodiment of this application, the step 301 may be implemented by the following steps 301*a* and 301*b*.

Step 301*a*. In a case that the indication information contained in the target DCI satisfies the first preset condition, the uplink data transmission apparatus determines an index value of a second DMRS indication information field based on the index value of the first DMRS indication information field and M first mappings.

In the embodiment of this application, each of the M first mappings is a mapping between index values of different DMRS indication information fields corresponding to different waveforms, and M is a positive integer;

Further optionally, in an embodiment of this application, the M first mappings may be mappings prestored in the uplink data transmission apparatus.

In the embodiment of this application, the second DMRS indication information field is used to indicate: a transmission port of a DMRS for use by the target uplink data, in a case of being configured to transmit the target uplink data using the second waveform.

Further optionally, in an embodiment of this application, the uplink data transmission apparatus may determine a matching first index value from M first index values of the first waveform based on the index value of the first DMRS indication information field, and then determine a mapped second index value from M second index values of the second waveform based on the first index value, and determine the second index value as the index value of the second DMRS indication information field.

For example, with reference to Tables 1 and 2, the uplink data transmission apparatus may determine the index value of the second DMRS indication information field (for example, value=0 in Table 1) based on the index value of the first DMRS indication information field (for example, value=2 in Table 2) according to the M first mappings, or determine the index value of the second DMRS indication information field (for example, value=1 in Table 1) based on the index value of the first DMRS indication information field (for example, value=3 in Table 2), or determine the index value of the second DMRS indication information field (for example, value=2 in Table 1) based on the index value of the first DMRS indication information field (for example, value=4 in Table 2), or determine the index value of the second DMRS indication information field (for example, value=3 in Table 1) based on the index value of the first DMRS indication information field (for example, value=5 in Table 2).

Step 301*b*. The uplink data transmission apparatus determines the target transmission port based on the index value of the second DMRS indication information field.

Further optionally, in an embodiment of this application, the uplink data transmission apparatus may determine the target transmission port based on the index value of the second DMRS indication information field and the first DMRS indication table (or the second DMRS indication table).

It can be seen that the uplink data transmission apparatus may determine a new index value based on the index value of the first DMRS indication information field according to the M first mappings to determine the target transmission port based on the new index value. Therefore, the reliability of the uplink data transmission apparatus in transmitting the uplink data can be improved.

Step 102*b*. The uplink data transmission apparatus transmits a DMRS using a second waveform based on the target transmission port.

It should be noted that in the embodiment of this application, the DMRS indication information field in the target DCI is used as an example to illustrate how the uplink data transmission apparatus interprets the sub-indication information in a new way and transmits the DMRS using the second waveform. For other sub-indication information in the target DCI, the same steps as in the foregoing embodiment can be applied, and other transmission parameters indicated by the other sub-indication information can be transmitted using the second waveform to transmit the target uplink data.

It can be seen that the uplink data transmission apparatus can interpret the first DMRS indication information in a new way to determine the target transmission port, such that the uplink data transmission apparatus can transmit the DMRS using the second waveform based on the target transmission port. Therefore, the reliability of the uplink data transmission apparatus in transmitting the uplink data can be improved.

It should be noted that the uplink data transmission method provided in the embodiment of this application may be executed by the uplink data transmission apparatus or a control module for executing the uplink data transmission method in the uplink data transmission apparatus. The uplink data transmission apparatus executing the uplink data transmission method is used as an example in the embodiments of this application to describe the uplink data transmission apparatus provided in the embodiments of this application.

Figure 5:
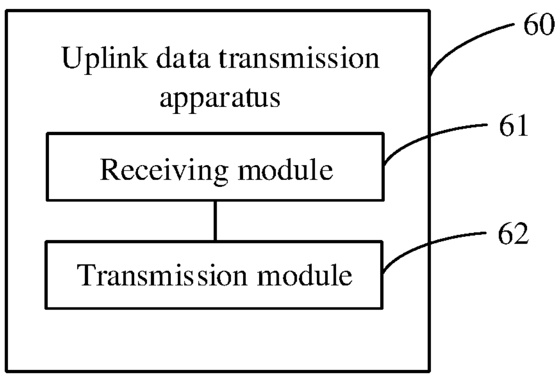
FIG. 5 is a first schematic structural diagram of an uplink data transmission apparatus according to an embodiment of this application.

FIG. 5 is a possible schematic structural diagram of a transmission apparatus involved in the embodiments of this application. As shown in FIG. 5, the uplink data transmission apparatus 60 may include a receiving module 61 and a transmission module 62.

The receiving module 61 is configured to receive target DCI from a network-side device in a case that the uplink data transmission apparatus 60 is configured to transmit uplink data using a first waveform, where the target DCI is used for scheduling target uplink data. The transmission module 62 is configured to transmit the target uplink data using a second waveform in a case that indication information contained in the target DCI received by the receiving module 61 satisfies a first preset condition. The indication information is used to indicate a transmission parameter for the target uplink data.

In a possible implementation, the indication information includes at least one of a TPMI field, a SRI field, a FDRA field, a MCS index value, or a CSI request field.

In a possible implementation, in a case that the first waveform is CP-OFDM and the second waveform is DFT-S-OFDM, the above indication information satisfying the first preset condition includes at least one of the following:

a rank corresponding to the TPMI field is less than or equal to a first threshold; a rank corresponding to the SRI field is less than or equal to a second threshold; PRBs indicated by the FDRA field are contiguous; the MCS index value is less than a third threshold; the indication information does not contain the CSI request field; or the indication information includes the CSI request field, and the CSI request field is not used to trigger the uplink data transmission apparatus 60 to send a CSI report.

Figure 6:
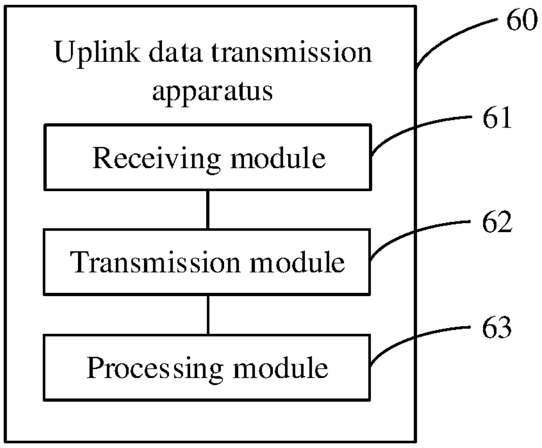
FIG. 6 is a second schematic structural diagram of an uplink data transmission apparatus according to an embodiment of this application.

In a possible implementation, the indication information includes a first DMRS indication information field, where the first DMRS indication information field is used to indicate: a transmission port of a DMRS for use by the target uplink data, in a case of being configured to transmit the target uplink data using the first waveform. With reference to FIG. 5, as shown in FIG. 6, the uplink data transmission apparatus 60 provided in this embodiment of this application may further include a processing module 63. The processing module 63 is configured to determine a target transmission port based on the first DMRS indication information field. The transmission module 62 is specifically configured to transmit the DMRS using the second waveform based on the target transmission port determined by the processing module 63.

In a possible implementation, the first DMRS indication information field corresponds to X bits, X is determined based on a waveform with a larger number of states between the first waveform and the second waveform, and X is a positive integer. In a case that the number of states corresponding to the second waveform is less than the number of states corresponding to the first waveform, the target transmission port is a transmission port indicated by the target bits; in a case that the number of states corresponding to the second waveform is greater than the number of states corresponding to the first waveform, the target transmission port is a transmission port determined based on the state corresponding to the second waveform. The target bit is the first Y bits or the last Z bits of X bits, and Y and Z are positive integers.

In a possible implementation, the processing module 63 is specifically configured to determine an index value of a second DMRS indication information field based on an index value of the first DMRS indication information field and M first mappings, M being a positive integer; and determine the target transmission port based on the index value of the second DMRS indication information field. Each of the first mappings is a mapping between index values of different DMRS indication information fields corresponding to different waveforms; and the second DMRS indication information field is used to indicate: a transmission port of a DMRS for use by the target uplink data, in a case of being configured to transmit the target uplink data using the second waveform.

In a possible implementation, the indication information contains N pieces of sub-indication information, N being a positive integer. The transmission module 62 is specifically configured to transmit the target uplink data using the second waveform based on other sub-indication information in a case that Q pieces of the N pieces of sub-indication information satisfy a second preset condition. The other sub-indication information is sub-indication information in the N pieces of sub-indication information other than the Q pieces of sub-indication information, Q being a positive integer.

According to the uplink data transmission apparatus provided in the embodiment of this application, in a case that the uplink data transmission apparatus is configured to transmit the uplink data using the first waveform, the uplink data transmission apparatus may determine whether the indication information contained in the target DCI satisfies the first preset condition, and in a case that the indication information is determined to satisfy the first preset condition, the uplink data transmission apparatus transmits the target uplink data using the second waveform instead of transmitting the target uplink data using the preconfigured first waveform. Therefore, the PAPR of reference signal symbols can be reduced. In this way, the amplifier efficiency of the uplink data transmission apparatus can be improved.

The uplink data transmission apparatus in the embodiment of this application may be an apparatus or electronic device with an operating system or may be a component, integrated circuit, or chip in a terminal. The apparatus or electronic device may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The uplink data transmission apparatus provided in the embodiments of this application can implement the processes that are implemented in the method embodiments of FIG. 1 and FIG. 4, with the same technical effects achieved. To avoid repetition, details are not described herein again.

Figure 7:
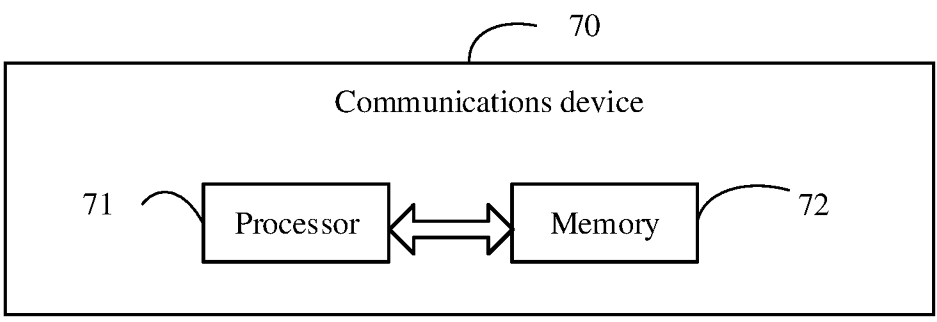
FIG. 7 is a schematic structural diagram of a communication device according to an embodiment of this application.

Optionally, as shown in FIG. 7, an embodiment of this application further provides a communication device 70, including a processor 71, a memory 72, and a program or instructions stored in the memory 72 and executable on the processor 71. For example, in a case that the communication device 70 is a terminal, when the program or instructions are executed by the processor 71, the processes of the foregoing embodiments of the uplink data transmission method are implemented, with the same technical effects achieved. To avoid repetition, details are not described herein again.

Figure 8:
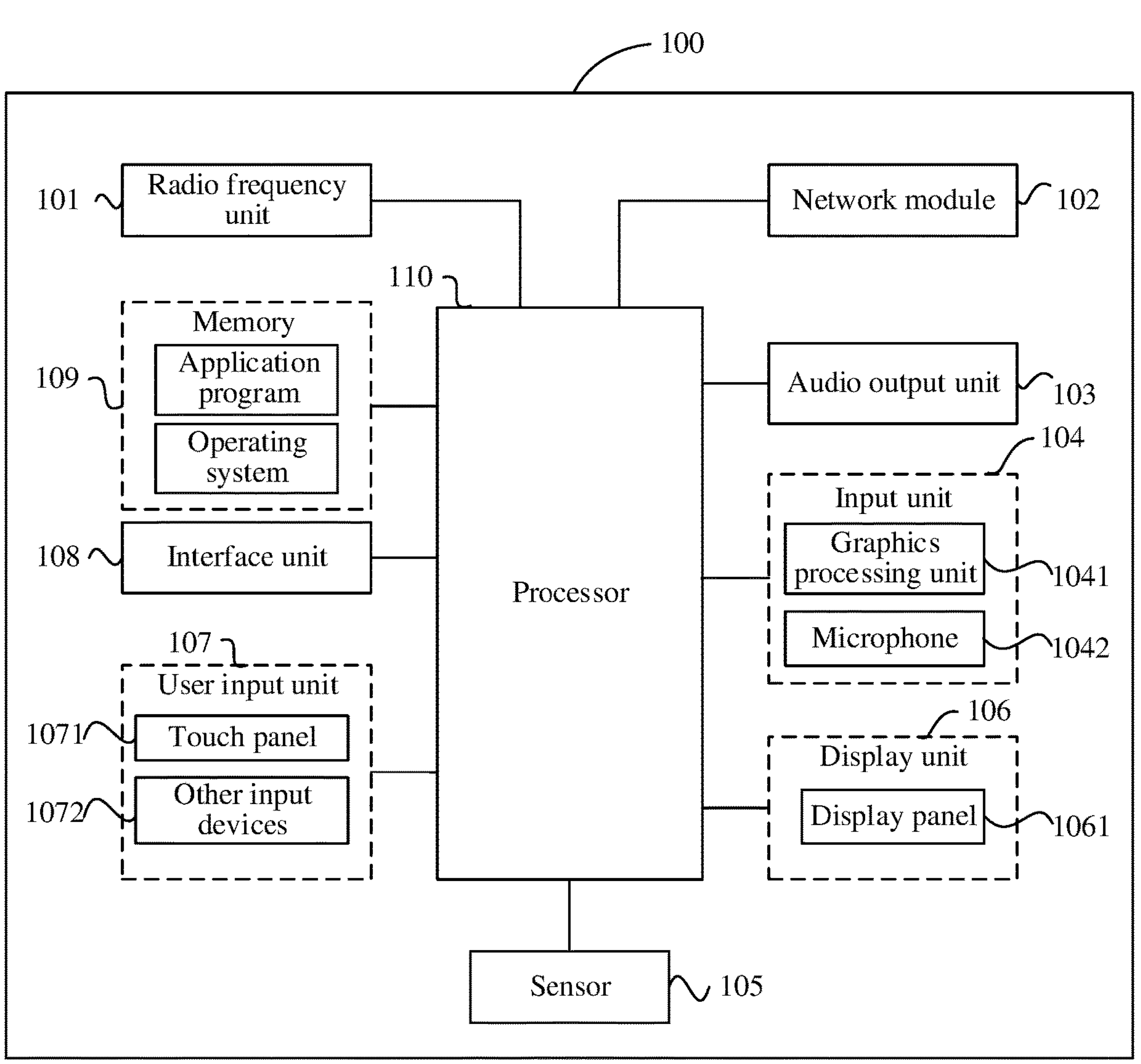
FIG. 8 is a schematic diagram of a hardware structure of a terminal according to an embodiment of this application.

An embodiment of this application further provides a terminal including a processor and a communication interface. The communication interface is used to receive target downlink control information DCI from a network-side device in a case that the terminal is configured to transmit uplink data using a first waveform, where the target DCI is used for scheduling target uplink data; and to transmit the target uplink data using a second waveform in a case that indication information contained in the target DCI satisfies a first preset condition; where the indication information is used to indicate a transmission parameter for the target uplink data. This terminal embodiment is corresponding to the above terminal-side method embodiment, and each implementation process and implementation manner of the above method embodiment can be applied in this terminal embodiment, with the same technical effects achieved. FIG. 8 is a schematic diagram of a hardware structure of a terminal for implementing the embodiments of this application.

The terminal 100 includes but is not limited to at least some components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the terminal 100 may further include a power supply (such as a battery) for supplying power to the components. The power supply may be logically connected to the processor 110 through a power management system. In this way, functions such as charge management, discharge management, and power consumption management are implemented by using the power management system. The structure of the terminal shown in FIG. 8 does not constitute any limitation on the terminal. The terminal may include more or fewer components than shown in the figure, or a combination of some components, or the components disposed differently. Details are not described herein again.

It can be understood that in this embodiment of this application, the input unit 104 may include a graphics processing unit (GPU) 1041 and a microphone 1042. The graphics processing unit 1041 processes image data of a still picture or video obtained by an image capture apparatus (such as a camera) in a video capture mode or an image capture mode. The display unit 106 may include a display panel 1061, and the display panel 1061 may be configured in a form of a liquid crystal display, an organic light-emitting diode, and the like. The user input unit 107 includes a touch panel 1071 and other input devices 1072. The touch panel 1071 is also referred to as a touchscreen. The touch panel 1071 may include two parts: a touch detection apparatus and a touch controller. The other input devices 1072 may include but be not limited to a physical keyboard, a function key (such as a volume control key or an on/off key), a trackball, a mouse, and a joystick. Details are not described herein.

In this embodiment of this application, the radio frequency unit 101 sends downlink data received from a network-side device to the processor 110 for processing, and in addition, sends uplink data to the network-side device. Generally, the radio frequency unit 101 includes but is not limited to an antenna, at least one amplifier, a transceiver, a coupler, a low noise amplifier, a duplexer, and the like.

The memory 109 may be configured to store software programs or instructions and various data. The memory 109 may mainly include a program or instruction storage region and a data storage region. The program or instruction storage region may store an operating system, an application program or instructions required by at least one function (for example, an audio play function or an image play function), and the like. In addition, the memory 109 may include a high-speed random access memory, and may further include a non-volatile memory, where the non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-volatile solid-state storage device.

The processor 110 may include one or more processing units. Optionally, the processor 110 may integrate an application processor and a modem processor. The application processor mainly processes the operating system, a user interface, an application program, or instructions, and the like. The modem processor mainly processes wireless communication. For example, the modem processor is a baseband processor. It can be understood that the modem processor may alternatively be not integrated in the processor 110.

The radio frequency unit 101 is configured to receive target DCI from a network-side device in a case that the terminal is configured to transmit uplink data using a first waveform, where the target DCI is used for scheduling target uplink data; and to transmit the target uplink data using a second waveform in a case that indication information contained in the target DCI satisfies a first preset condition.

The indication information is used to indicate a transmission parameter for the target uplink data.

According to the terminal provided in the embodiment of this application, in a case that the terminal is configured to transmit the uplink data using the first waveform, the terminal may determine whether the indication information contained in the target DCI satisfies the first preset condition, and in a case that the indication information is determined to satisfy the first preset condition, the terminal transmits the target uplink data using the second waveform instead of transmitting the target uplink data using the preconfigured first waveform. Therefore, the PAPR of reference signal symbols can be reduced. In this way, the amplifier efficiency of the terminal can be improved.

Optionally, in an embodiment of this application, the indication information contains a first demodulation reference signal DMRS indication information field, where the first DMRS indication information field is used to indicate: a transmission port of a DMRS for use by the target uplink data, in a case of being configured to transmit the target uplink data using the first waveform.

The processor 110 is configured to determine a target transmission port based on the first DMRS indication information field.

The radio frequency unit 101 is specifically configured to transmit the DMRS using the second waveform based on the target transmission port.

It can be seen that the terminal can interpret the first DMRS indication information in a new way to determine the target transmission port, such that the terminal can transmit the DMRS using the second waveform based on the target transmission port. Therefore, the reliability of the terminal in transmitting the uplink data can be improved.

Optionally, in an embodiment of this application, the processor 110 is specifically configured to determine an index value of a second DMRS indication information field based on an index value of the first DMRS indication information field and M first mappings, M being a positive integer; and determine the target transmission port based on the index value of the second DMRS indication information field.

Each of the first mappings is a mapping between index values of different DMRS indication information fields corresponding to different waveforms; and the second DMRS indication information field is used to indicate: a transmission port of a DMRS for use by the target uplink data, in a case of being configured to transmit the target uplink data using the second waveform.

It can be seen that the terminal can determine a new index value based on the index value of the first DMRS indication information field according to the M first mappings to determine the target transmission port based on the new index value. Therefore, the reliability of the terminal in transmitting the uplink data can be improved.

Optionally, in an embodiment of this application, the indication information contains N pieces of sub-indication information, and N is a positive integer.

The radio frequency unit 101 is specifically configured to transmit the target uplink data using the second waveform based on other sub-indication information in a case that Q pieces of the N pieces of sub-indication information satisfy a second preset condition.

The other sub-indication information is sub-indication information in the N pieces of sub-indication information other than the Q pieces of sub-indication information, Q being a positive integer.

It can be seen that the terminal can transmit the target uplink data using the second waveform according to the other sub-indication information that is valid for the second waveform of the N pieces of sub-indication information contained in the target DCI, without transmitting the target uplink data according to the Q pieces of sub-indication information that are invalid for the second waveform. Therefore, the reliability of the terminal in transmitting the uplink data can be improved.

An embodiment of this application further provides a non-transitory readable storage medium, where the non-transitory readable storage medium stores a program or instructions, and when the program or instructions are executed by a processor, the processes of the foregoing embodiments of the uplink data transmission method are implemented, with the same technical effects achieved. To avoid repetition, details are not described herein again.

The processor is a processor in the terminal described in the foregoing embodiment. The non-transitory readable storage medium includes a non-transitory computer-readable storage medium, such as a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions to implement the processes of the foregoing embodiments of the uplink data transmission method, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

By means of the foregoing description of the implementations, persons skilled in the art may clearly understand that the method in the foregoing embodiment may be implemented by software with a necessary general hardware platform. Certainly, the method in the foregoing embodiment may also be implemented by hardware. However, in many cases, the former is a preferred implementation. Based on such an understanding, the technical solutions of the present invention essentially or the part contributing to the prior art may be implemented in a form of a computer software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. An uplink data transmission method, wherein the method comprises:

in a case that user equipment (UE) is configured to transmit uplink data using a first waveform, receiving, by the UE, target downlink control information (DCI) from a network-side device, wherein the target DCI is used for scheduling target uplink data; and in a case that indication information contained in the target DCI satisfies a first preset condition, transmitting, by the UE, the target uplink data using a second waveform; wherein the indication information is used to indicate a transmission parameter for the target uplink data;

wherein the indication information comprises a transmit precoding matrix indicator (TPMI) field; in a case that the first waveform is cyclic prefix orthogonal frequency division multiplexing (CP-OFDM) and the second waveform is discrete fourier transform spread spectrum orthogonal frequency division multiplexing (DFT-S-OFDM), the indication information satisfying the first preset condition comprises: a rank corresponding to the TPMI field is less than or equal to a first threshold.

2. The method according to claim 1, wherein the indication information further comprises at least one of the following: a sounding reference signal resource indicator (SRI) field, a frequency domain resource allocation (FDRA) field, a modulation and coding scheme (MCS) index value, or a channel state information (CSI) request field.

3. The method according to claim 2, wherein, the indication information satisfying the first preset condition further comprises at least one of the following:

a rank corresponding to the SRI field is less than or equal to a second threshold;

physical resource blocks (PRBs) indicated by the FDRA field are contiguous;

the MCS index value is less than a third threshold;

the indication information does not contain the CSI request field; or the indication information contains the CSI request field, and the CSI request field is not used to trigger the UE to send a CSI report.

4. The method according to claim 1, wherein the indication information further comprises a first demodulation reference signal (DMRS) indication information field, the first DMRS indication information field being used to indicate: a transmission port of a DMRS for use by the target uplink data, in a case of being configured to transmit the target uplink data using the first waveform;

before the transmitting, by the UE, the target uplink data using a second waveform, the method further comprises:

determining, by the UE, a target transmission port based on the first DMRS indication information field; and the transmitting, by the UE, the target uplink data using a second waveform comprises:

transmitting, by the UE, the DMRS based on the target transmission port using the second waveform.

5. The method according to claim 4, wherein the first DMRS indication information field corresponds to X bits, X being determined based on a waveform with a larger number of states between the first waveform and the second waveform, and X being a positive integer; wherein in a case that the number of states corresponding to the second waveform is less than the number of states corresponding to the first waveform, the target transmission port is a transmission port indicated by a target bit; and in a case that the number of states corresponding to the second waveform is greater than the number of states corresponding to the first waveform, the target transmission port is a transmission port determined based on a state corresponding to the second waveform;

wherein the target bit is the first Y bits or the last Z bits, of the X bits, Y and Z both being positive integers.

6. The method according to claim 4, wherein the determining, by the UE, a target transmission port based on the first DMRS indication information field comprises:

determining, by the UE, an index value of a second DMRS indication information field based on an index value of the first DMRS indication information field and M first mappings, M being a positive integer; and determining, by the UE, the target transmission port based on the index value of the second DMRS indication information field;

wherein each of the first mappings is a mapping between index values of different DMRS indication information fields corresponding to different waveforms; and the second DMRS indication information field is used to indicate: a transmission port of a DMRS for use by the target uplink data, in a case of being configured to transmit the target uplink data using the second waveform.

7. The method according to claim 1, wherein the indication information comprises N pieces of sub-indication information, N being a positive integer; and the transmitting, by the UE, the target uplink data using a second waveform comprises:

in a case that Q pieces of the N pieces of sub-indication information satisfy a second preset condition, transmitting, by the UE, the target uplink data using the second waveform based on other sub-indication information;

wherein the other sub-indication information is sub-indication information in the N pieces of sub-indication information other than the Q pieces of sub-indication information, Q being a positive integer.

8. A user equipment (UE) comprising a processor, a memory, and a program or instructions stored on the memory and executable on the processor, wherein the program or instructions, when executed by the processor, cause the processor to perform:

in a case that the UE is configured to transmit uplink data using a first waveform, receiving target downlink control information (DCI) from a network-side device, wherein the target DCI is used for scheduling target uplink data; and in a case that indication information contained in the target DCI satisfies a first preset condition, transmitting the target uplink data using a second waveform; wherein the indication information is used to indicate a transmission parameter for the target uplink data;

wherein the indication information comprises a transmit precoding matrix indicator (TPMI) field; in a case that the first waveform is cyclic prefix orthogonal frequency division multiplexing (CP-OFDM) and the second waveform is discrete fourier transform spread spectrum orthogonal frequency division multiplexing (DFT-S-OFDM), the indication information satisfying the first preset condition comprises: a rank corresponding to the TPMI field is less than or equal to a first threshold.

9. The user equipment according to claim 8, wherein the indication information further comprises at least one of the following: a sounding reference signal resource indicator (SRI) field, a frequency domain resource allocation (FDRA) field, a modulation and coding scheme (MCS) index value, or a channel state information (CSI) request field.

10. The user equipment according to claim 9, wherein, the indication information satisfying the first preset condition further comprises at least one of the following:

a rank corresponding to the SRI field is less than or equal to a second threshold;

physical resource blocks (PRBs) indicated by the FDRA field are contiguous;

the MCS index value is less than a third threshold;

the indication information does not contain the CSI request field; or the indication information contains the CSI request field, and the CSI request field is not used to trigger the UE to send a CSI report.

11. The user equipment according to claim 9, wherein the indication information further comprises a first demodulation reference signal (DMRS) indication information field, the first DMRS indication information field being used to indicate: a transmission port of a DMRS for use by the target uplink data, in a case of being configured to transmit the target uplink data using the first waveform;

the program or instructions, when executed by the processor, cause the processor to further perform:

determining a target transmission port based on the first DMRS indication information field; and the transmitting the target uplink data using a second waveform comprises:

transmitting the DMRS based on the target transmission port using the second waveform.

12. The user equipment according to claim 11, wherein the first DMRS indication information field corresponds to X bits, X being determined based on a waveform with a larger number of states between the first waveform and the second waveform, and X being a positive integer; wherein in a case that the number of states corresponding to the second waveform is less than the number of states corresponding to the first waveform, the target transmission port is a transmission port indicated by a target bit; and in a case that the number of states corresponding to the second waveform is greater than the number of states corresponding to the first waveform, the target transmission port is a transmission port determined based on a state corresponding to the second waveform;

wherein the target bit is the first Y bits or the last Z bits, of the X bits, Y and Z both being positive integers.

13. The user equipment according to claim 11, wherein the determining a target transmission port based on the first DMRS indication information field comprises:

determining an index value of a second DMRS indication information field based on an index value of the first DMRS indication information field and M first mappings, M being a positive integer; and determining the target transmission port based on the index value of the second DMRS indication information field;

wherein each of the first mappings is a mapping between index values of different DMRS indication information fields corresponding to different waveforms; and the second DMRS indication information field is used to indicate: a transmission port of a DMRS for use by the target uplink data, in a case of being configured to transmit the target uplink data using the second waveform.

14. The user equipment according to claim 8, wherein the indication information comprises N pieces of sub-indication information, N being a positive integer; and the transmitting the target uplink data using a second waveform comprises:

in a case that Q pieces of the N pieces of sub-indication information satisfy a second preset condition, transmitting the target uplink data using the second waveform based on other sub-indication information;

wherein the other sub-indication information is sub-indication information in the N pieces of sub-indication information other than the Q pieces of sub-indication information, Q being a positive integer.

15. A non-transitory readable storage medium, wherein the readable storage medium stores a program or instructions, and the program or instructions, when executed by a processor of a user equipment (UE), cause the UE to perform:

in a case that the UE is configured to transmit uplink data using a first waveform, receiving target downlink control information (DCI) from a network-side device, wherein the target DCI is used for scheduling target uplink data; and in a case that indication information contained in the target DCI satisfies a first preset condition, transmitting the target uplink data using a second waveform; wherein the indication information is used to indicate a transmission parameter for the target uplink data;

wherein the indication information comprises a transmit precoding matrix indicator (TPMI) field; in a case that the first waveform is cyclic prefix orthogonal frequency division multiplexing (CP-OFDM) and the second waveform is discrete fourier transform spread spectrum orthogonal frequency division multiplexing (DFT-S-OFDM), the indication information satisfying the first preset condition comprises: a rank corresponding to the TPMI field is less than or equal to a first threshold.

16. The non-transitory readable storage medium according to claim 15, wherein the indication information further comprises at least one of the following: a sounding reference signal resource indicator (SRI) field, a frequency domain resource allocation (FDRA) field, a modulation and coding scheme (MCS) index value, or a channel state information (CSI) request field.

17. The non-transitory readable storage medium according to claim 16, wherein, the indication information satisfying the first preset condition further comprises at least one of the following:

a rank corresponding to the SRI field is less than or equal to a second threshold;

physical resource blocks (PRBs) indicated by the FDRA field are contiguous;

the MCS index value is less than a third threshold;

the indication information does not contain the CSI request field; or the indication information contains the CSI request field, and the CSI request field is not used to trigger the UE to send a CSI report.

18. The non-transitory readable storage medium according to claim 16, wherein the indication information further comprises a first demodulation reference signal (DMRS) indication information field, the first DMRS indication information field being used to indicate: a transmission port of a DMRS for use by the target uplink data, in a case of being configured to transmit the target uplink data using the first waveform;

the program or instructions, when executed by the processor, cause the processor to further perform:

determining a target transmission port based on the first DMRS indication information field; and the transmitting the target uplink data using a second waveform comprises:

transmitting the DMRS based on the target transmission port using the second waveform.

19. The non-transitory readable storage medium according to claim 18, wherein the first DMRS indication information field corresponds to X bits, X being determined based on a waveform with a larger number of states between the first waveform and the second waveform, and X being a positive integer; wherein in a case that the number of states corresponding to the second waveform is less than the number of states corresponding to the first waveform, the target transmission port is a transmission port indicated by a target bit; and in a case that the number of states corresponding to the second waveform is greater than the number of states corresponding to the first waveform, the target transmission port is a transmission port determined based on a state corresponding to the second waveform;

wherein the target bit is the first Y bits or the last Z bits, of the X bits, Y and Z both being positive integers.

20. The non-transitory readable storage medium according to claim 18, wherein the determining a target transmission port based on the first DMRS indication information field comprises:

determining an index value of a second DMRS indication information field based on an index value of the first DMRS indication information field and M first mappings, M being a positive integer; and determining the target transmission port based on the index value of the second DMRS indication information field;

wherein each of the first mappings is a mapping between index values of different DMRS indication information fields corresponding to different waveforms; and the second DMRS indication information field is used to indicate: a transmission port of a DMRS for use by the target uplink data, in a case of being configured to transmit the target uplink data using the second waveform.

* * * * *